(12) United States Patent
Gammon

(10) Patent No.: US 11,009,138 B2
(45) Date of Patent: May 18, 2021

(54) FLOW MAXIMIZER

(71) Applicant: GAMMON TECHNICAL PRODUCTS, INC., Manasquan, NJ (US)

(72) Inventor: James H. Gammon, Manasquan, NJ (US)

(73) Assignee: GAMMON TECHNICAL PRODUCTS, INC., Manasquan, NJ (US)

( * ) Notice: Subject to any disclaimer, the term of this patent is extended or adjusted under 35 U.S.C. 154(b) by 104 days.

(21) Appl. No.: 16/553,726

(22) Filed: Aug. 28, 2019

(65) Prior Publication Data

US 2020/0386336 A1    Dec. 10, 2020

Related U.S. Application Data

(60) Provisional application No. 62/856,805, filed on Jun. 4, 2019.

(51) Int. Cl.
| | |
|---|---|
| *F16K 17/04* | (2006.01) |
| *F16K 31/56* | (2006.01) |
| *F15B 13/04* | (2006.01) |

(52) U.S. Cl.
CPC ........ *F16K 17/0406* (2013.01); *F16K 31/566* (2013.01); *F15B 13/0405* (2013.01)

(58) Field of Classification Search
CPC .. F16K 17/042; F16K 17/0406; F16K 31/566; F15B 13/0405; Y10T 137/7797; Y10T 137/7815; Y10T 137/785; Y10T 137/7851; Y10T 137/7852; Y10T 137/7853

See application file for complete search history.

(56) References Cited

U.S. PATENT DOCUMENTS

| | | | | |
|---|---|---|---|---|
| 2,644,480 | A * | 7/1953 | Earle | F16K 17/042 137/469 |
| 3,088,489 | A * | 5/1963 | Stacey | E02F 9/2221 91/388 |
| 3,194,255 | A * | 7/1965 | Flaton | F16K 15/06 137/220 |
| 3,218,882 | A * | 11/1965 | Stephens et al. | G05G 5/06 74/527 |
| 3,426,779 | A * | 2/1969 | Corbin | F16K 17/042 137/68.19 |

(Continued)

FOREIGN PATENT DOCUMENTS

| | | | | |
|---|---|---|---|---|
| GB | 1208497 A | * | 10/1970 | ............. A62C 13/76 |
| GB | 1301981 A | * | 1/1973 | ........... F16K 17/042 |
| GB | 1329389 A | * | 9/1973 | ........... F16K 17/042 |

*Primary Examiner* — Jessica Cahill
(74) *Attorney, Agent, or Firm* — Shumaker, Loop & Kendrick, LLP; James D. Miller

(57) ABSTRACT

A hose end regulator for regulating pressure in fluid includes a main body having a fluid inlet and fluid outlet. A poppet moves between an open position to permit fluid to flow through the fluid outlet and a closed position to militate against fluid flowing through the fluid outlet. A primary spring permits the poppet to move between the open position and the closed position. A flow maximizer minimizes movement of the primary spring until a predetermined fluid pressure is reached within the main outer body.

17 Claims, 4 Drawing Sheets

(56) References Cited

U.S. PATENT DOCUMENTS

| | | | | |
|---|---|---|---|---|
| 3,463,443 | A | * | 8/1969 | Churchill ................ F16K 31/06 |
| | | | | 251/70 |
| 3,592,222 | A | * | 7/1971 | Goss .................... F16K 17/042 |
| | | | | 137/467 |
| 3,605,788 | A | | 9/1971 | Brown |
| 3,620,237 | A | * | 11/1971 | Sindall ................ A62C 13/003 |
| | | | | 137/70 |
| 3,754,567 | A | * | 8/1973 | Whitten ................ F16K 17/042 |
| | | | | 137/509 |
| 4,178,960 | A | | 12/1979 | Napolitano et al. |
| 4,416,301 | A | * | 11/1983 | Brumm .................. F16K 1/123 |
| | | | | 137/220 |
| 7,117,887 | B2 | * | 10/2006 | Dulac .................... G05D 16/10 |
| | | | | 137/494 |
| 8,136,547 | B2 | * | 3/2012 | Francini ................ F16K 15/063 |
| | | | | 137/514.5 |
| 9,352,847 | B2 | * | 5/2016 | Mouskis ................ G05D 16/166 |
| 2004/0031524 | A1 | | 2/2004 | Schulze |
| 2013/0061942 | A1 | | 3/2013 | Hulsey |
| 2015/0096648 | A1 | | 4/2015 | Ballard et al. |

* cited by examiner

FLOW MAXIMIZER

CROSS REFERENCE TO RELATED APPLICATIONS

This patent application claims the benefit of U.S. Provisional Patent Application Ser. No. 62/856,805 filed on Jun. 4, 2019, the entire disclosure of the above patent application is hereby incorporated herein by reference.

FIELD OF THE INVENTION

The present invention relates to a flow maximizer and more specifically for a flow maximizer for direct acting valves in a fluid system.

BACKGROUND OF THE INVENTION

As commonly known, in pressure control and pressure relief of fluid systems, there are two kinds of valves typically employed: a direct acting valve and a pilot operated valve. The direct acting valve employs a biasing device or spring directly operating the valve between an open state or a closed state. Typically, in a normally closed direct acting valve, the biasing device is biased towards a seat of the valve in the closed state to block the port through the valve. When a force or pressure greater than the force of the biasing device is applied to the spring, such as fluid passing through the valve, the spring is moved or compressed away from the seat of the valve to the open state of the direct acting valve. In a similar, but alternate configuration, the biasing device is biased away from the seat of the valve in a normally open state, to allow fluid to flow through the valve, and the spring extends to the seat of the valve to close the valve.

The pilot operated valve employs a "control pilot" or differential pressure between the inlet port and the outlet port of the pilot operated valve to control the pilot operated valve. The pilot operated valve employs a seal that moves the valve between the open state and the closed state. The pilot operated valve remains in a closed state by piping a small amount of fluid to a downstream side of the seal with a balanced pressure on the upstream side of the seal. A separate actuator in communication with the piping releases pressure in the line if the pressure upstream of the seal crosses a predetermined value. If the pressure upstream of the seal exceeds the predetermined value, the actuator releases pressure in the piping so the pressure downstream of the seal is less than the pressure upstream of the seal. As a result of the pressure release, the seal moves towards the downstream side to position the pilot operated valve in the open position. Alternately, the valve can move from the open state to the closed state in a similar manner depending on the application. As a result, the pilot operated valves are more efficient compared to the direct acting valves because the actuator permits the seal to open and close instantaneously due to the downstream pressure determination. The gradual movement of the seal is proportional to the pressure being released which ultimately minimizes pressure losses in the system and is more economical for larger flow values. Additionally, it results in faster flowtimes.

For example, with a predetermined or set outlet pressure, such as 50 pounds per square inch (psi) of pressure, both the direct acting valve and the pilot operated valve are supposed to remain open until the pressure downstream of the seal or at the outlet pressure reaches the set pressure. Once the set pressure is reached, the valves close. In the direct acting valve, the spring requires the valve to start closing at a lower outlet pressure, such as 40 psi, for example, in order to be fully closed at 50 psi of the outlet pressure. Conversely, the pilot operated valve is completely open until the downstream pressure or the outlet pressure is substantially equal to 50 psi. Once the outlet pressure equals 50 psi, the pilot operated valve closes instantaneously instead of gradually closing like the direct acting valve. As a result, the pilot operated valve allows for more flow to occur between the 40 psi and the set 50 psi outlet pressure. However, the pilot operated valves can be more larger, heavier, and costly than the direct acting valves or more complex to maintain.

In operations for refueling tanks in aircrafts, a minimum time spent in refueling is desired. Therefore, more fluid that can be sent through the valve without having to release pressure is desired. Hose end regulators are often employed to fuel aircrafts. Optimally, a hose end regulator utilizing a direct acting valve with flow maximizing features that minimizes fueling time is required.

The present invention contemplates a hose end regulators for fueling aircrafts that is efficient and minimizes fueling time and cost.

SUMMARY OF THE INVENTION

In accordance with present invention a hose end regulators for fueling aircrafts that is efficient and minimizes fueling time and cost is surprisingly discovered.

In an embodiment of the disclosure, a hose end regulator for regulating pressure in fluid includes a main body having a fluid inlet and fluid outlet is disclosed. A poppet moves between an open position to permit fluid to flow through the fluid outlet and a closed position to militate against fluid flowing through the fluid outlet. A primary spring permits the poppet to move between the open position and the closed position. A flow maximizer minimizes movement of the primary spring until a predetermined fluid pressure is reached within the main outer body.

In another embodiment of the disclosure, a hose end regulator for regulating pressure in fluid is disclosed. The hose end regulator includes a main body having a fluid inlet and a fluid outlet. The main body includes a main outer body and a main inner body cooperating with each other to define a flow channel. A poppet assembly controls fluid flowing through the flow channel. The poppet assembly includes a poppet coupled to a piston. The piston is disposed in a bore of the main inner housing. A primary spring extends between a first seating surface formed in the main inner housing and a second seating surface disposed within the piston. The primary spring biases the poppet of the poppet assembly towards the fluid outlet. A flow maximizer minimizes a movement of the primary spring until a predetermined fluid pressure is reached within the main body.

In yet another embodiment of the disclosure, a flow maximizer for regulating fluid flow through a valve is disclosed. The flow maximizer includes a cylindrical body having a first end and a second end. A catch is formed on an inner surface of the body proximate to the second end. An actuator is disposed at least partially within the body at the second end, the actuator configured to move axially within the body. A return spring is disposed within the body and extending between the first end and the actuator. The return spring biasing the actuator away from the first end. A pair of release balls is disposed within a hole formed through the actuator. The pair of release balls are biased away from each other to permit at least one of the release balls to be received in the catch.

BRIEF DESCRIPTION OF THE DRAWINGS

The above, as well as other advantages of the present invention will become readily apparent to those skilled in the art from the following detailed description of a preferred embodiment when considered in the light of the accompanying drawings in which.

DETAILED DESCRIPTION OF EXEMPLARY EMBODIMENTS OF THE INVENTION

Figure 1:
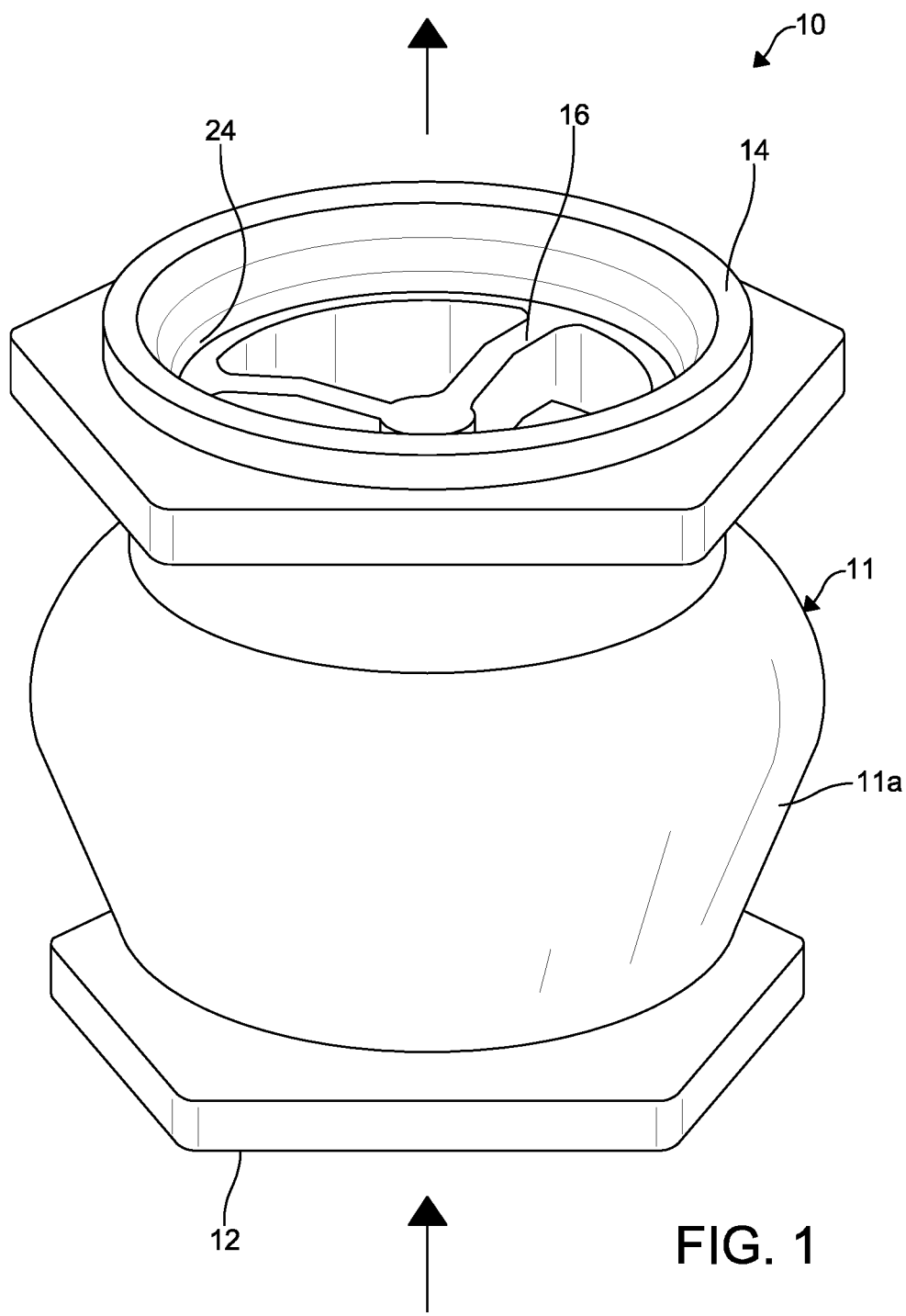
FIG. 1 is a front perspective view of a hose end regulator according to an embodiment of the present disclosure.

The following detailed description and appended drawings describe and illustrate various exemplary embodiments of the invention. The description and drawings serve to enable one skilled in the art to make and use the invention, and are not intended to limit the scope of the invention in any manner.

"A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters. Where any conflict or ambiguity may exist between a document incorporated by reference and this detailed description, the present detailed description controls.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "bottom," "top," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
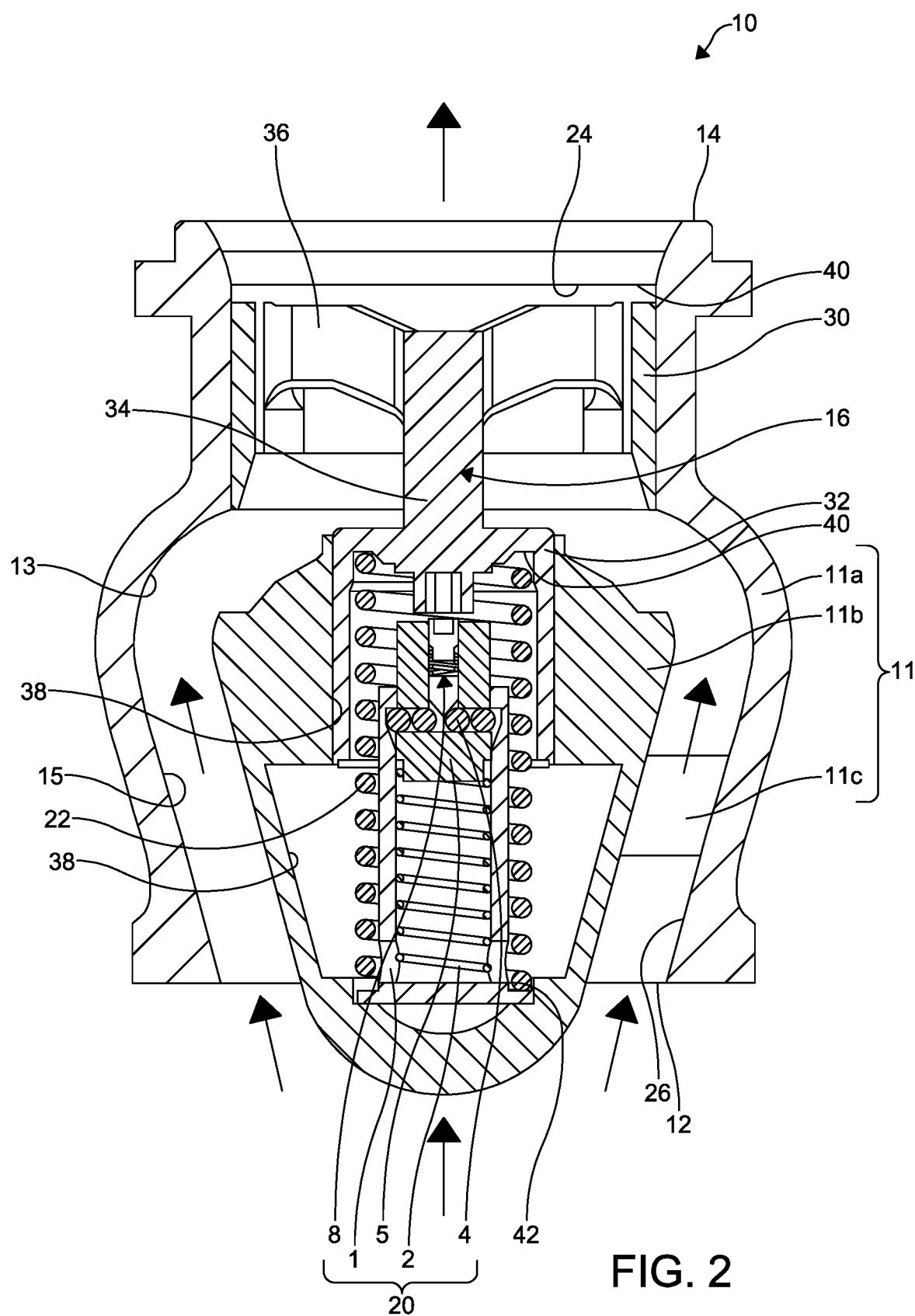
FIG. 2 is a cross-sectional front elevational view of the hose end regulator of FIG. 1.

A hose end regulator (HER) 10 according to an embodiment of the invention is shown in FIGS. 1-2. The HER 10 is configured as a pressure controlling valve for attachment to hoses such as fueling hoses for aircrafts. The HER 10 is coupled to the end of a delivery hose and protects the aircraft from excess pressure and damage due to pressure surges. Although, it is understood the HER 10 can be configured for alternate fueling or hose applications, as desired, without departing from the scope of the present disclosure. It is also understood, the HER 10 can be employed for other fluid applications, if desired.

The HER 10 has a main body 11 including an outer body portion 11a, an inner body portion 11b, an inlet end 12 for receiving the fluid such as fuel, an outlet end 14 for conveying the fluid therefrom, a poppet assembly 16 to permit or prevent downstream flow from exiting the HER 10, and a flow maximizer 20. The outer body portion 11a defines a chamber 13. The inner body portion 11b is disposed in the chamber 13 and is integrally connected to the outer body portion 11a by a connecting portion 11c. Although, the inner body portion 11b and the outer body portion 11a can be separately formed and coupled to each other by other means, if desired. The connecting portion 11c is generally shown as a connecting strip extending radially outwardly from the inner body portion 11b to the outer body portion 11a. However, the connection portion 11c can have any shape and be formed along any portion between the inner body portion 11b and the outer body portion 11a. For example, the connection portion 11c can be formed at multiple portions between the body portions 11a, 11b or any other portion as desired. The outer body portion 11a cooperates with the inner body portion 11b to define a flow channel 15 for a fluid to flow therethrough. A direction of a flow of fluid through the HER 10 is shown by the arrow. It is understood, other components can be included with the HER 10 such as seals or various other control ports or pistons as commonly known in the field of art.

The poppet assembly 16 includes a poppet 30 configured as a ring received in an outlet port 24 of the HER 10, a piston 32, a shaft 34 extending axially from the piston to couple the poppet 30 to the piston 32, and a plurality of spokes 36 extending radially inwardly from an inner surface of the poppet 30 and coupling the poppet 30 to the shaft 34. As illustrated, the poppet assembly 16 is integrally formed wherein the poppet 30, piston 32, shaft 34, and spokes 36 are formed from the same material. However, it is understood, the poppet assembly 16 can be formed from separate parts and coupled together, wherein the poppet 30, piston 32, shaft 34, and spokes 36 are separately formed and coupled together. The piston 32 is received in a bore 38 formed in the inner body portion 11b and is spaced from an end of the poppet 30.

The poppet assembly 16 moves axially from an open position to a closed position. In the open position, the poppet 30 is positioned adjacent the outlet end 14 to permit fluid to flow from the flow channel 15 through the poppet 30 and through the outlet end 14. In the closed position, the poppet 30 is positioned against or adjacent the main inner body 11b, wherein the poppet 30 militates against the fluid flowing from the flow channel 15 through the outlet end 14.

The movement of the poppet assembly 16 is mechanically controlled by the flow maximizer 20 and a primary spring 22 extending from a first primary seating surface 40 within the main inner body 11b and a second primary seating surface 42 within the poppet assembly 16. The primary spring 22 receives the flow maximizer 20 and is positioned within the piston 32 of the poppet assembly 16. The primary spring 22 and the flow maximizer 20 bias the poppet 30 to the open position. The internal chamber 40 in which the primary spring 22 is disposed is vented to atmosphere via a small hole (not shown) drilled through the connection portion 11c. It is understood, in another embodiment, not shown, the flow maximizer 20 is disposed outside of the primary spring 22.

Figure 3:
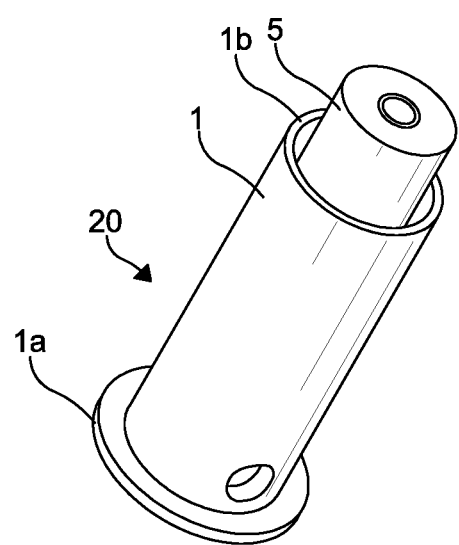
FIG. 3 is a front perspective view of a flow maximizer of the hose end regulator of FIGS. 1-2.
Figure 4:
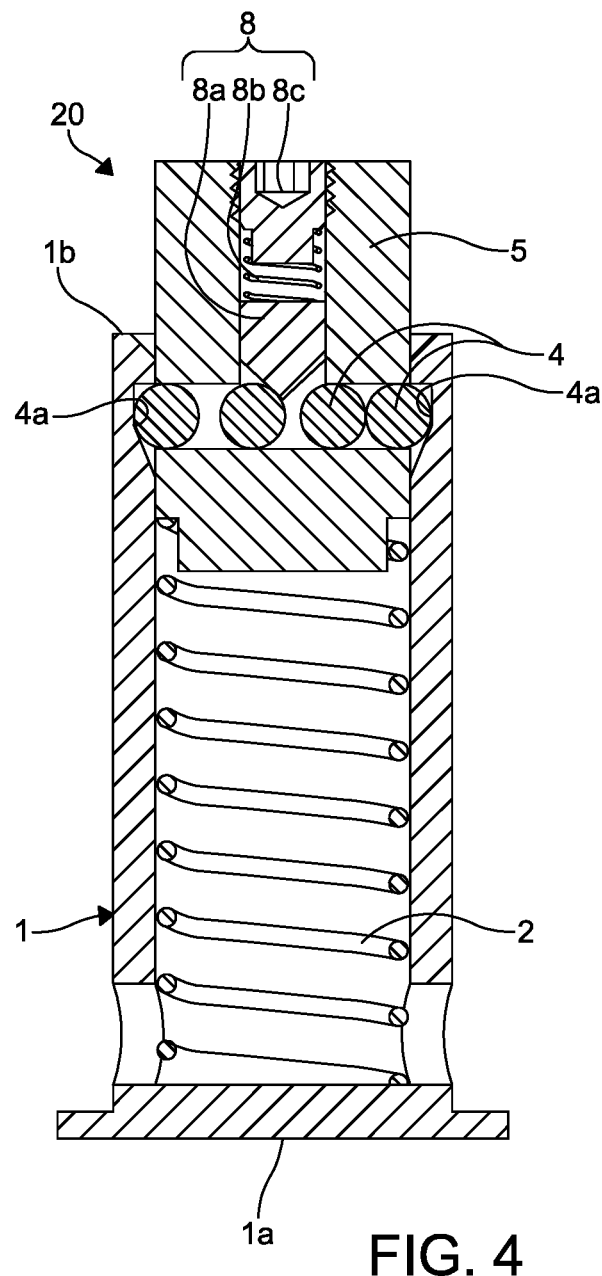
FIG. 4 is a cross-sectional front elevational view of the flow maximizer of FIG. 3.

As shown in FIGS. 2-4, the flow maximizer 20 includes a body 1, a return spring 2, release balls 4, and an actuator 5. The body 1 is substantially tubular and cylindrical. Although, the body 1 can have various shapes as desired. The body 1 includes a first end 1a and a second end 1b for receiving the actuator 5. The return spring 2 extends between the first end 1a of the body 1 and the actuator 5, biasing the actuator 5 away from the first end 1a of the body 1 towards the inner surface of the piston 32. Four of the balls 4 are shown extending diametrically through the actuator 5. It is understood, more than four or fewer than four of the balls 4 can be contemplated, if desired. A release pin assembly 8 is employed that extends axially through the actuator 5. The release pin assembly 8 includes a release pin 8a engaging the balls 4 and biasing the balls 4 towards the catches 4a, an adjuster spring 8b biasing the release pin 8a towards the balls 4, and an adjuster screw 8c controlling a spring force of the adjuster spring 8b. The release pin assembly 8 maintains the balls 4 (two outermost ones of the balls 4) within a catch or catches 4a formed on an inner surface of the body 1 between the actuator 5 and the body 1 until the desired set pressures, respectively, overcome the spring force of the return spring 2 and the adjuster spring 8b to allow the balls 4 to slide down a slope of the catches 4a. As a force downstream of the flow maximizer 20 begins to overcome the spring force of the primary spring 22, the actuator 5 remains stationary or moves only minimally due to a spring force of the return spring 2 and the balls 4 biasing away from each other into the catches 4a. Eventually, the spring force of the return spring 2 will be overcome but at a greater force than the primary spring 22. Once the balls 4 slide past the catches 4a, a force can overcome the primary spring 22 to permit the piston 32 to downwardly in the bore 38 to close the HER 10. The adjuster screw 8c is employed by a user to adjust the force required to overcome the spring force of the adjuster spring 8b. The adjuster screw 8c allows the flow maximizer 20 to be adjustable. Specifically, the adjuster screw 8c can be turned towards the release pin 8a to cause the adjuster spring 8b to bias the release pin 8a with greater force against the balls 4. As a result, the release pin 8a biases the balls 4 into the catches 4a until a greater force is overcome to allow the balls 4 to slide past the catches 4a. Conversely, the adjuster screw 8c can be turned away from the release pin 8a to bias the release pin 8a with lesser force towards the balls 4 into the catches 4a so the balls 4 are capable of sliding past the catches 4a with a lesser force.

Figure 5:
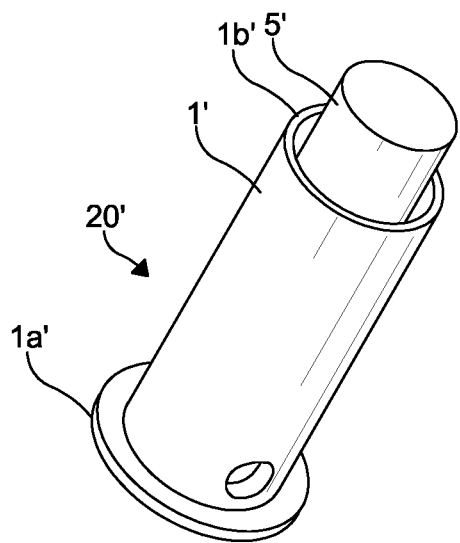
FIG. 5 is a front perspective view of a flow maximizer of the hose end regulator of FIGS. 1-2 according to another embodiment of the disclosure.
Figure 6:
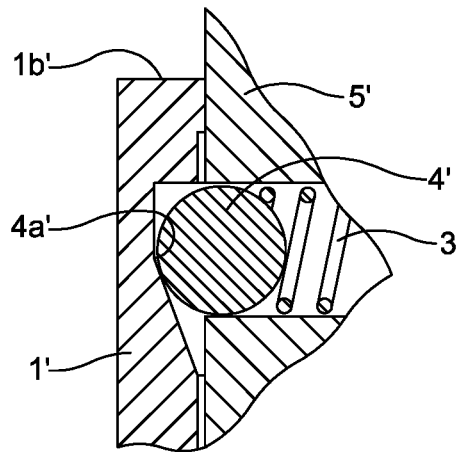
FIG. 6 is a fragmentary cross-sectional front elevational view of the flow maximizer of FIG. 5.
Figure 7:
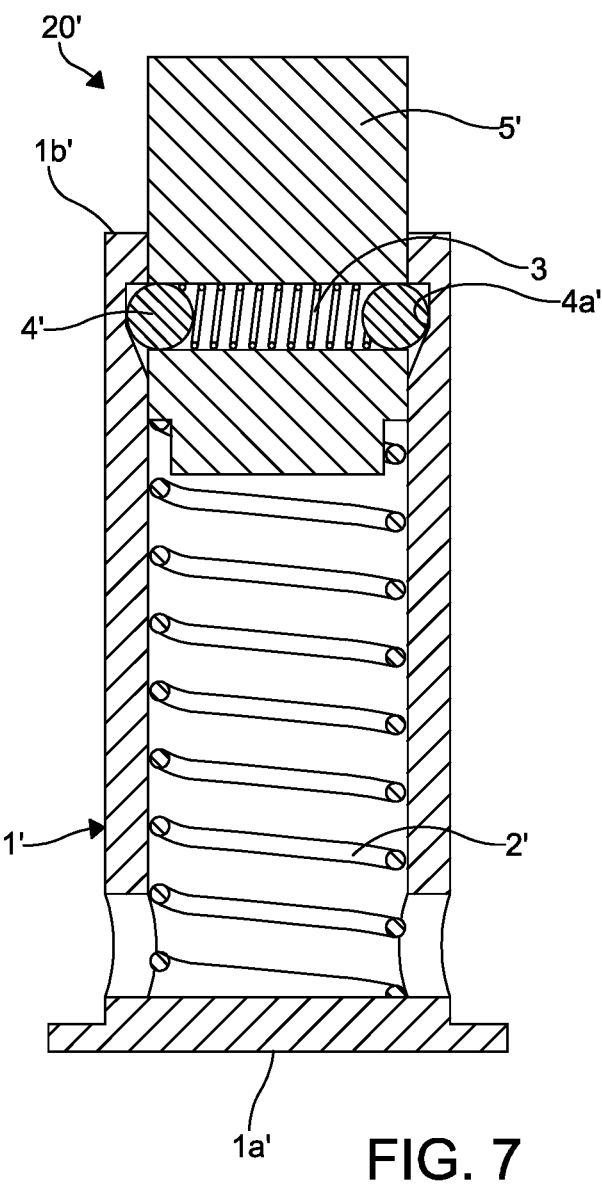
FIG. 7 is a cross-sectional front elevational view of the flow maximizer of FIG. 5.

The flow maximizer 20' of FIGS. 5-7 is similar to the flow maximizer 20 of FIGS. 2-4 except the flow maximizer 20' of FIGS. 5-7 includes a release spring 3. Features of the flow maximizer 20' of FIGS. 5-7 similar to the flow maximizer 20 of FIGS. 2-4 are referenced with the same reference numeral and a prime (') symbol for convenience. The release spring 3 is disposed intermediate two of the balls 4' and biases the balls 4' away from each other and against the catches 4a'. As a force downstream of the flow maximizer 20' begins to overcome the spring force of the primary spring 22, the actuator 5' remains stationary or moves only minimally due to a spring force of the return spring 2' and the spring force of the release spring 3 biasing the balls 4' away from each other into the catches 4a'. Eventually, the spring force of the return spring 2' will be overcome but at a greater force than the primary spring 22. As the actuator 5' moves inwardly in the body 1' towards the first end 1a', the balls 4' move in the same direction against a sloped surface of the catches 4a'. As a result, the spring force of the release spring 3 will be overcome by the force of the balls 4' compressing towards each as they move along the inner surface of the body 1'. Once the balls 4' move past the catches 4a', the flow maximizer 20' permits the primary spring 22 to release the poppet 30 to the closed position and close the HER 10.

Advantageously, with the flow maximizer 20, 20', the HER 10 can be held open longer than prior art HERs until the desired set pressure is met. Without the flow maximizer 20, 20', the HER 10, due to the settings on the primary spring 22, 22', will begin to shut at a pressure lower than the desired set pressure. As a result of the flow maximizer 20, 20', fueling time can be increased. For example, for a set pressure of 45 psi, the HER 10 without the flow maximizer 20 begins to close at 30 psi to assure it will be fully closed by 45 psi. The flow maximizer 20 configured as a spring-loaded catch, as described hereinabove, will hold the poppet 30, 30' in the open position until the pressure reaches 45 psi and then moves to the closed position. Thus, refueling times are dramatically reduced when filling smaller tanks on large aircraft or all tanks on smaller aircraft. The examples used herein are for illustration only. Other desired set pressure can be employed as desired.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A hose end regulator for regulating pressure in fluid comprising:
 a main body having a fluid inlet and a fluid outlet;

a poppet moving between an open position to permit a fluid to flow through the fluid outlet and a closed position to militate against the fluid flowing through the fluid outlet;

a primary spring permitting the poppet to move between the open position and the closed position, the primary spring urging the poppet to the open position; and a flow maximizer minimizing movement of the primary spring until a predetermined fluid pressure is reached within the main body, wherein the flow maximizer includes a body and an actuator received at least partially within the body, and wherein a return spring is disposed within the body and extends between a first end of the body and the actuator.

2. The hose end regulator of claim 1, wherein the flow maximizer is received in the primary spring.

3. The hose end regulator of claim 1, wherein the actuator cooperates with release balls disposed within catches formed on an inner surface of the body to regulate movement of the actuator, the return spring, and the primary spring.

4. The hose end regulator of claim 3, wherein the flow maximizer includes a release spring extending through the actuator and between a pair of the release balls, the release spring biasing the pair of the release balls away from each other towards respective ones of the catches.

5. The hose end regulator of claim 1, wherein at least four release balls extend through the actuator.

6. The hose end regulator of claim 5, wherein a release pin assembly cooperates with the release balls to regulate movement of the actuator, the return spring, and the primary spring, wherein the release pin assembly includes a release pin configured to engage the release balls, an adjuster spring cooperating with the release pin to regulate movement of the actuator, and an adjustment screw adjusting a spring force of the adjuster spring.

7. The hose end regulator of claim 1, wherein the main body includes a main outer body and a main inner body cooperating with each other to define a flow channel for the fluid to flow from the fluid inlet to the fluid outlet.

8. The hose end regulator of claim 7, wherein the poppet in the closed position engages the main inner body and the poppet in the open position is adjacent the fluid outlet.

9. The hose end regulator of claim 7, wherein the poppet is coupled to a piston, and wherein the piston, the flow maximizer, and the primary spring are disposed within a bore of the main inner housing.

10. The hose end regulator of claim 9, wherein the primary spring extends from a first primary seating surface of the main inner body to a second primary seating surface within the piston.

11. A hose end regulator for regulating pressure in fluid comprising:

a main body having a fluid inlet and a fluid outlet, the main body including a main outer body and a main inner body cooperating with each other to define a flow channel;

a poppet assembly controlling fluid flowing through the flow channel, the poppet assembly including a poppet coupled to a piston, the piston disposed in a bore of the main inner housing;

a primary spring extending between a first seating surface formed in the main inner housing and a second seating surface disposed within the piston, the primary spring biasing the poppet of the poppet assembly towards the fluid outlet; and a flow maximizer minimizing movement of the primary spring until a predetermined fluid pressure is reached within the main body, wherein the flow maximizer includes a cylindrical body, an actuator disposed at least partially within the body and moveable in an axial direction, and at least two release balls disposed within a hole formed in the actuator, the release balls biased towards catches formed in an inner surface of the body.

12. The hose end regulator of claim 11, wherein the flow maximizer is disposed within the primary spring or outside from the primary spring.

13. The hose end regulator of claim 11, wherein a release spring biases the release balls towards the catches.

14. The hose end regulator of claim 11, wherein a release pin assembly and at least three release balls cooperate with each other to bias the release balls towards the catches.

15. The hose end regulator of claim 11, wherein a return spring is disposed within the body and extends between an end of the body and the actuator.

16. A flow maximizer for regulating fluid flow through a valve comprising:

a cylindrical body having a first end and a second end, a catch formed on an inner surface of the body proximate to the second end;

an actuator disposed at least partially within the body at the second end, the actuator configured to move axially within the body;

a return spring disposed within the body and extending between the first end and the actuator, the return spring biasing the actuator away from the first end; and a pair of release balls disposed within a hole formed through the actuator, the pair of release balls biased away from each other by a release spring to permit at least one of the release balls to be received in the catch.

17. The flow maximizer of claim 16, further comprising a release pin assembly cooperating with the release balls to regulate axial movement of the actuator.

* * * * *